US012193507B2

(12) United States Patent
Rogan et al.

(10) Patent No.: US 12,193,507 B2
(45) Date of Patent: Jan. 14, 2025

(54) INDUCTION HEATING ASSEMBLY FOR A VAPOUR GENERATING DEVICE

(71) Applicant: JT International S.A., Geneva (CH)

(72) Inventors: Andrew Robert John Rogan, Forres (GB); Mark Gill, London (GB)

(73) Assignee: JT International SA (CH)

(*) Notice: Subject to any disclaimer, the term of this patent is extended or adjusted under 35 U.S.C. 154(b) by 0 days.

(21) Appl. No.: 18/130,659

(22) Filed: Apr. 4, 2023

(65) Prior Publication Data

US 2023/0292844 A1 Sep. 21, 2023

Related U.S. Application Data

(63) Continuation of application No. 16/958,483, filed as application No. PCT/EP2018/086125 on Dec. 20, 2018, now Pat. No. 11,638,446.

(30) Foreign Application Priority Data

Dec. 28, 2017 (EP) .................................... 17210843

(51) Int. Cl.

| | |
|---|---|
| ***A24F 13/00*** | (2006.01) |
| ***A24F 40/20*** | (2020.01) |
| ***A24F 40/465*** | (2020.01) |
| ***A24F 40/48*** | (2020.01) |
| ***H01F 27/36*** | (2006.01) |
| ***H05B 6/10*** | (2006.01) |
| *H05B 1/02* | (2006.01) |

(52) U.S. Cl.

CPC ............ *A24F 40/465* (2020.01); *A24F 40/20* (2020.01); *A24F 40/48* (2020.01); *H01F 27/36* (2013.01); *H05B 6/105* (2013.01); *H05B 1/0244* (2013.01)

(58) Field of Classification Search

CPC ........................................................ A24F 47/00
USPC ................................................... 131/328–329
See application file for complete search history.

(56) References Cited

U.S. PATENT DOCUMENTS

| | | | | |
|---|---|---|---|---|
| 9,717,277 | B2 * | 8/2017 | Mironov | H05B 6/108 |
| 10,791,760 | B2 * | 10/2020 | Zuber | H05B 1/0244 |
| 10,856,575 | B2 * | 12/2020 | Gill | H05B 6/06 |
| 2007/0102013 | A1 | 5/2007 | Adams et al. | |

(Continued)

FOREIGN PATENT DOCUMENTS

| | | |
|---|---|---|
| CN | 103783674 A | 5/2014 |
| CN | 203748673 U | 8/2014 |

(Continued)

OTHER PUBLICATIONS

International Search Report for Application No. PCT/EP2018/086125 mailed Mar. 19, 2019, 3 pages.

(Continued)

*Primary Examiner* — Phuong K Dinh
(74) *Attorney, Agent, or Firm* — Lerner David LLP

(57) ABSTRACT

An induction heating assembly for a vapour generating device, includes an outer body; an induction coil arranged inward of the outer body; a heating compartment defined inward of the induction coil and arranged to receive, in use, a body comprising a vaporisable substance and an induction heatable susceptor; wherein the separation between the outer body and the induction coil defines an air vent arranged to allow air flow around the induction coil and to the heating compartment.

19 Claims, 6 Drawing Sheets

(56) References Cited

U.S. PATENT DOCUMENTS

| | | | |
|---|---|---|---|
| 2014/0338686 A1 | 11/2014 | Plojoux et al. | |
| 2016/0120221 A1 | 5/2016 | Mironov et al. | |
| 2016/0295921 A1 | 10/2016 | Mironov et al. | |
| 2017/0071250 A1 | 3/2017 | Mironov et al. | |
| 2017/0079326 A1 | 3/2017 | Mironov | |
| 2017/0156403 A1 | 6/2017 | Gill et al. | |
| 2017/0311648 A1* | 11/2017 | Gill | A24F 40/42 |
| 2021/0059310 A1 | 3/2021 | Rogan et al. | |

FOREIGN PATENT DOCUMENTS

| | | | |
|---|---|---|---|
| CN | 203762288 | U | 8/2014 |
| CN | 105307523 | A | 2/2016 |
| CN | 104095291 | B | 1/2017 |
| CN | 106690427 | A | 5/2017 |
| CN | 107105776 | A | 8/2017 |
| CN | 206443211 | U | 8/2017 |
| CN | 206565299 | U | 10/2017 |
| JP | 2009509523 | A | 3/2009 |
| JP | 2015504667 | A | 2/2015 |
| JP | 2016528874 | A | 9/2016 |
| JP | 2016529874 | A | 9/2016 |
| JP | 2021511018 | A | 5/2021 |
| WO | 2015177046 | A1 | 11/2015 |
| WO | 2016120344 | A2 | 8/2016 |

OTHER PUBLICATIONS

Extended European Search Report for Application No. 23158192.7 dated May 30, 2023. 9 pgs.

Search Report dated Dec. 26, 2022 from the Office Action for Chinese Application No. 201880084385.0 Issued Jan. 4, 2023, pp. 1-3.

* cited by examiner

INDUCTION HEATING ASSEMBLY FOR A VAPOUR GENERATING DEVICE

CROSS-REFERENCE TO RELATED APPLICATIONS

The present application is a continuation of U.S. application Ser. No. 16/958,483, filed on Jun. 26, 2020, which is a national phase entry under U.S.C. § 371 of International Application No. PCT/EP2018/086125, filed Dec. 20, 2018, published in English, which claims priority to European Application No. 17210843.3, filed Dec. 28, 2017, the disclosures of which are incorporated herein by reference.

BACKGROUND

The present invention relates to an induction heating assembly for a vapour generating device.

Devices which heat, rather than burn, a substance to produce a vapour for inhalation have become popular with consumers in recent years.

Such devices can use one of a number of different approaches to provide heat to the substance. One such approach is that of simple provision of a heating element to which electrical power is provided to heat the element, the element in turn heating the substance to generate vapour.

One way to achieve such vapour generation is to provide a vapour generating device which employs an inductive heating approach. In such a device an inductions coil (hereinafter also referred to as an inductor and induction heating device) is provided with the device and a susceptor is provided with the vapour generation substance. Electrical energy is provided to the inductor when a user activates the device which in turn creates an electromagnetic (EM) field. The susceptor couples with the field and generates heat which is transferred to the substance and vapour is created as the substance is heated.

Using induction heating to generate vapour has the potential to provide controlled heating and therefore controlled vapour generation. However, in practice such an approach can result in unsuitable temperatures unknowingly being produced in the vapour generation device. This can waste power making it expensive to operate and risks damaging components or making ineffective use of the vapour generation device inconveniencing users who expect a simple and reliable device.

This has been addressed previously by monitoring temperatures in a device. However, some monitored temperatures have been found to be unreliable, and providing for temperature monitoring adds to the component count as well as using additional power, even if the overall power usage is more efficient due to the temperature monitoring.

The present invention seeks to mitigate at least some of the above problems.

SUMMARY OF INVENTION

According to a first aspect, there is provided an induction heating assembly for a vapour generating device, the heating assembly comprising: an outer body; an induction coil arranged inward of the outer body; a heating compartment defined inward of the induction coil and arranged to receive, in use, a body comprising a vaporisable substance and an induction heatable susceptor, wherein the separation between the outer body and the induction coil defines an air vent arranged to allow air flow around the induction coil and to the heating compartment.

The susceptor may comprise one or more, but not limited, of aluminium, iron, nickel, stainless steel and alloys thereof, e.g. nickel chromium. With the application of an electromagnetic field in its vicinity, the susceptor may generate heat due to eddy currents and magnetic hysteresis losses resulting in a conversion of energy from electromagnetic to heat.

We have found that allowing air to flow around the induction coil and to a longitudinal end of the heating compartment allows for heat transfer to the air before it enters the heating compartment. This cools the induction coil, which allows it to function more efficiently and stabilises its operation as well as reducing the amount of heating that needs to be applied directly to the vaporisable substance since the air passing into the heating compartment also heats the vaporisable substance (or at least reduces the cooling effect it has). This reduces the amount of energy required to heat the vaporisable substance. A further benefit is that heat transfer to the outer body is limited, which prevents the outer body, and therefore an externally surface from becoming hot. These benefits are achieved without needing to increase the distance between the induction coil and the induction heatable susceptor when the body is located in the heating compartment. This means that energy transfer from the induction coil to the susceptor is not reduced, allowing for energy to be transferred, and therefore for heat to be produced, as efficiently as possible.

The induction coil may be a cylindrical induction coil. In such a case, the induction coil may be arranged radially inward of the outer body with the heating compartment defined radially inward of the induction coil, and wherein the separation between the outer body and the induction coil defines an air vent may be a radial separation. As an alternative to a cylindrical induction coil, the induction coil may be a spiral flat induction coil.

The air vent may be shaped to direct air flow around the induction coil before directing air flow to the heating compartment. This provides insulation to the outer body by separating the induction coil from the outer body by air in the vent whilst also heating the air before it passes into the heating compartment to reduce the amount of heating that needs to be applied in the heating compartment. This reduces power usage whilst also protecting the user from exposure to heat.

The heating compartment may be adjacent the induction coil. While the induction coil may be embedded in a wall of the heating compartment, since there is no other element between the wall within which the induction coil is embedded and the chamber of the heating compartment and since the wall in part defines the heating compartment, we intend this to fall within the meaning of the term "adjacent".

As set out above, the body comprises a vaporisable substance and an induction heatable susceptor. The vaporisable substance and the induction heatable susceptor may be contained by the body. In this configuration, heating produced by induction occurs only within the body. As such, heat generated within the heating compartment is not generated outside the body when the body is located in the heating compartment. In other words, the heating compartment may be arranged to only provide heating within the body when the body is present in the heating compartment. This is because heat produced by the induction heatable susceptor when a current is passed through the induction coil is produced only inside the body in such a configuration.

Heat may be generated outside the heating compartment. Typically heat generated outside the heating compartment is generated by the induction coil. This heat may provide additional heating of any vaporisable substance within the heating compartment.

The air vent may be arranged to allow air flow around the induction coil and to any part of the heating compartment. Typically however, the air vent is arranged to allow air flow around the induction coil and to an axial end of the heating compartment. This avoids the air vent interfering with the induction coil in any manner, and allows the maximum amount of heat transfer to air in the air vent since its path to an axial end of the heating compartment will be longer than if the air vent passed to any other part of the heating compartment.

In the first aspect when the body is located in the heating compartment, the body may abut the sides of the heating compartment, preferably, in the heating compartment, there is only an airflow path through the body when the body is located in the heating compartment. In this case, there may be no airflow path from an inlet to the heating compartment to an outlet of the heating compartment between the induction coil and the body. This restricts air flow around the body between the body and the sides of the heating compartment.

This allows the susceptor to be located as close as possible to the induction coil and increases air flow through the body instead of around the body.

The air vent may be formed in any suitable manner. Typically, the induction heating assembly further comprises one or more separators arranged between the outer body and induction coil to define two or more layers of air vents. This allows for more efficient heat transfer from the induction coil to the air, and therefore limiting of heat transfer to the outer body since the multiple layers provide increased surface area relative to the volume of air for heat transfer.

Alternatively or additionally, the induction heating assembly may further comprise ribs supporting the outer body, induction coil, and, optionally, separators, in mechanical connection, and dividing the air vents into segments. By this we intend to mean that there may be ribs that provide a mechanical connection between the outer body, induction coil, and where they are present, the separators, which ribs support these components and divide the air vents into segments. This provides suitable structural support for the various components while allowing a large amount of surface area for air to pass over thereby increasing the heat transfer effect. When the induction coil is a cylindrical induction coil, the segments may be annular segments Having layers of air vents provides a number of options for how the air passes through the air vents from an inlet of the air vent to the heating compartment. Typically, the layers of air vents are arranged to provide an air flow path passing through a plurality of air vent layers passing from one air vent layer to another air vent layer. This allows the air flow path to be lengthened by passing through multiple layers providing a greater length over which heat can transfer to air passing through the air vents. This also makes heat transfer more efficient since air in one layer is warmed by air in an inner layer. In this arrangement, preferably the air path may pass along a length of the heating compartment in one layer and passes in the reverse direction along the length of the heating compartment in the next layer.

In an alternate arrangement of the air vents, the layers of air vents may be arranged to provide an air flow path that passes through at least two air vent layers by splitting between each respective air vent layer. This is also a means of providing more efficient heat transfer by allowing air in multiple layers to warm simultaneously. Of course, the plurality of the layers, or the layers between which the air flow path is split, may be radially adjacent (i.e. concentric) layers.

Typically, the induction heating assembly may further comprise structures in the air vent arranged to define one or more air flow paths. This provides increased surface area for air to pass over for heat transfer to occur.

The air flow may follow any suitable path. Typically, the air flow path or paths are arranged to be one or more of; a spiral around the induction coil; a zig-zag in the longitudinal direction of the coil; and a zig-zag in the transverse direction of the coil. This maximises the length of each airflow path allowing heat transfer from the induction coil to be more effective since the air spends a longer period passing along the respective airflow path allowing more heat to be absorbed. When the induction coil is a cylindrical induction coil, the spiral may be a spiral rotating around the circumference of the induction coil, the zig-zag in the longitudinal direction of the coil may be in the axial direction of the coil and the zig-zag in the transverse direction of the coil may be in the circumferential direction of the coil.

The air flow path or paths may cover any amount of the induction coil to allow heat transfer from the induction coil. Typically, the air flow paths cover more than 50%, preferably 50-90%, more preferably 50-80% of the outer surface of the induction coil. We have found that this provides a suitable amount of surface area over which heat transfer is able to occur while maintaining structural rigidity and without making manufacture overly complex.

The induction heating assembly may further comprise an electromagnetic shield, the shield being arranged: between the coil and the innermost air vent; between concentric air vents; substantially surrounding the circumference of the outermost air vent; or being part of the wall of the air vent. The EM shield restricts the amount of EM radiation that passes out of the assembly. By providing the EM shield adjacent (whilst still being enclosed or not) an air vent as is the case here, heat is also able to be transferred from the EM shield to the air should the EM shield be warmed to a temperature above that of the air in the air vent.

The induction coil may be located in any position suitable. Typically, the induction coil is arranged within a wall housing the heating compartment. This provides protection for the induction coil from environmental factors in the air and in the body from its constituents.

The assembly may be arranged to operate in use with a fluctuating electromagnetic field having a magnetic flux density of between approximately 0.5 Tesla (T) and approximately 2.0 T at the point of highest concentration.

The power source and circuitry may be configured to operate at a high frequency. Preferably, the power source and circuitry may be configured to operate at a frequency of between approximately 80 kHz and 500 kHz, preferably approximately 150 kHz and 250 kHz, more preferably approximately 200 kHz Whilst the induction coil may comprise any suitable material, typically the induction coil may comprise a Litz wire or a Litz cable.

The susceptor may be shaped to provide a vent through which air is able to pass in use. This may be achieved by the susceptor being provided in the shape of a tube, i.e. providing a tubular susceptor. This is beneficial because the susceptor generates heat and effectively allows pre-heating of air entering the body/cartridge as it passes through the tube. It has been found that tubular susceptors are also better at generating heat than other shapes of susceptors as such a tubular susceptor has a closed circle electrical path. The susceptor also provides electro-magnetic shielding to a user due to its shape and the way in which it interacts with electro-magnetic influences on it. Accordingly, while the susceptor may be used only to generate heat, typically, there is an induction heatable susceptor having a tubular shape forming at least part of the air vent. Of course this susceptor may be a further susceptor in addition to the susceptor of the body.

According to a second aspect, there is provided a vapour generating system comprising: an induction heating assembly according to the first aspect; a body comprising a vaporisable substance and an induction heatable susceptor; wherein the body is, in use, arranged within the heating compartment of the assembly.

The vaporisable substance may be any suitable substance capable of forming a vapour. The substance may comprise plant derived material and in particular, the substance may comprise tobacco. Typically, the vaporisable substance is a solid or semi-solid tobacco substance. This allows the susceptor to be held in position within the body so that heating is able to be provided repeatably and consistently. Example types of vapour generating solids include powder, granules, pellets, shreds, strands, porous material or sheets.

Preferably, the vaporisable substance may comprise an aerosol-former. Examples of aerosol-formers include polyhyrdric alcohols and mixtures thereof such as glycerine or propylene glycol. Typically, the vaporisable substance may comprise an aerosol-former content of between approximately 5% and approximately 50% on a dry weight basis. Preferably, the vaporisable substance may comprise an aerosol-former content of approximately 15% on a dry weight basis.

Also, the vaporisable substance may be the aerosol-former itself. In this case, the vaporisable substance may be liquid. Also, in this case, the body may have a liquid retaining substance (e.g. a bundle of fibres, porous material such as ceramic, etc.) which retains the liquid to be vaporized by the vaporizer such as a heater and allows a vapour to be formed and released/emitted from the liquid retaining substance towards the air outlet for inhalation by a user.

Upon heating, the vaporisable substance may release volatile compounds. The volatile compounds may include nicotine or flavour compounds such as tobacco flavouring.

The body may be a capsule which includes in use a vaporisable substance inside an air permeable shell. The air permeable material may be a material which is electrically insulating and non-magnetic. The material may have a high air permeability to allow air to flow through the material with a resistance to high temperatures. Examples of suitable air permeable materials include cellulose fibres, paper, cotton and silk. The air permeable material may also act as a filter. Alternatively, the body may be a vaporisable substance wrapped in paper. Alternatively, the body may be a vaporisable substance held inside a material that is not air permeable, but which comprises appropriate perforation or openings to allow air flow. Alternatively, the body may be the vaporisable substance itself. The body may be formed substantially in the shape of a stick.

The susceptor may be located within the body in any suitable position and in any suitable manner. Typically, the susceptor or susceptors are held within and surrounded by the vaporisable substance such that the vaporisable substance forms, in use, a heat absorbing layer between the susceptor or susceptors and the outer surface of the assembly. This provides effective heating of the vaporisable substance whilst also limiting the amount of heat that passes to the other components of the vapour generating system.

BRIEF DESCRIPTION OF FIGURES

An example of an induction heating assembly is described in detail below, with reference to the accompanying figures, in which.

DETAILED DESCRIPTION

We now describe an example of a vapour generating device, including a description of an example induction heating assembly and an example induction heatable cartridge. An example method of monitoring temperature in a vapour generating device is also described.

Figure 1:
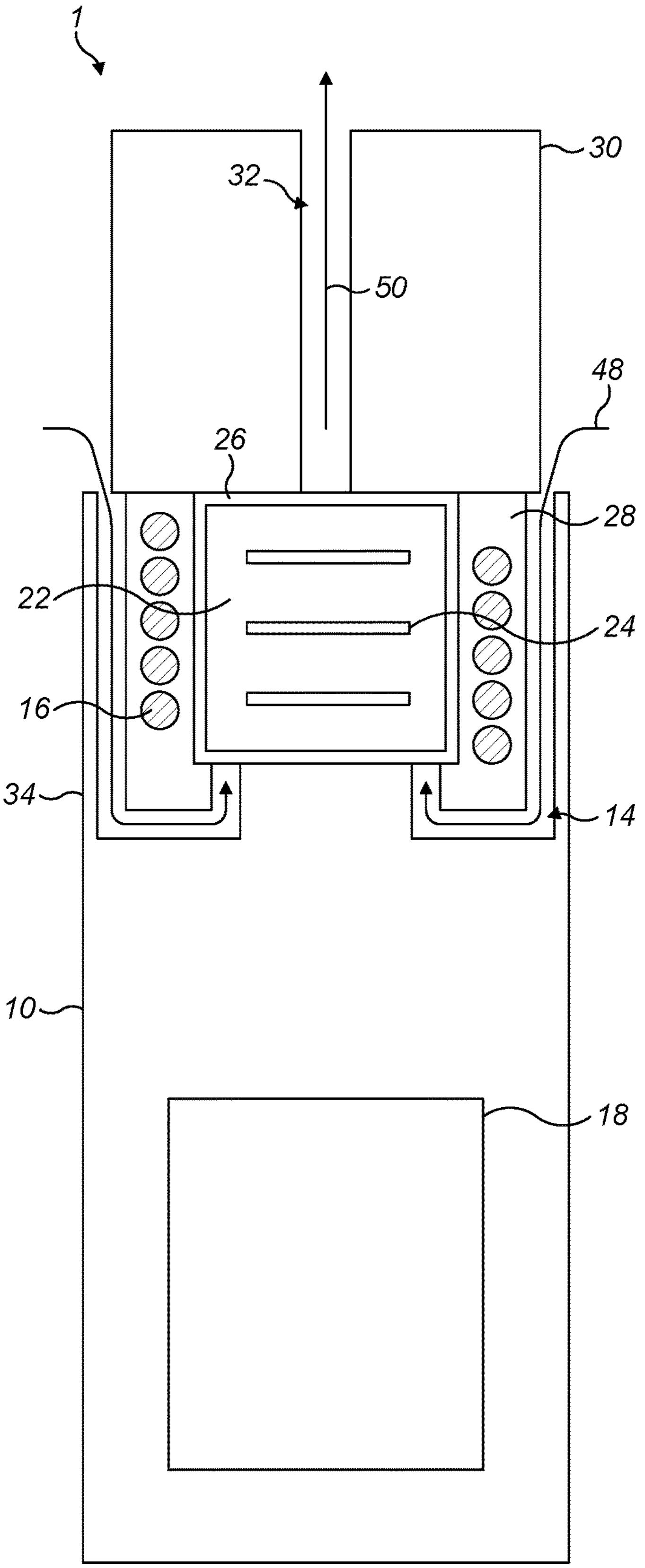
FIG. 1 shows a schematic view of an example vapour generating device.
Figure 2:
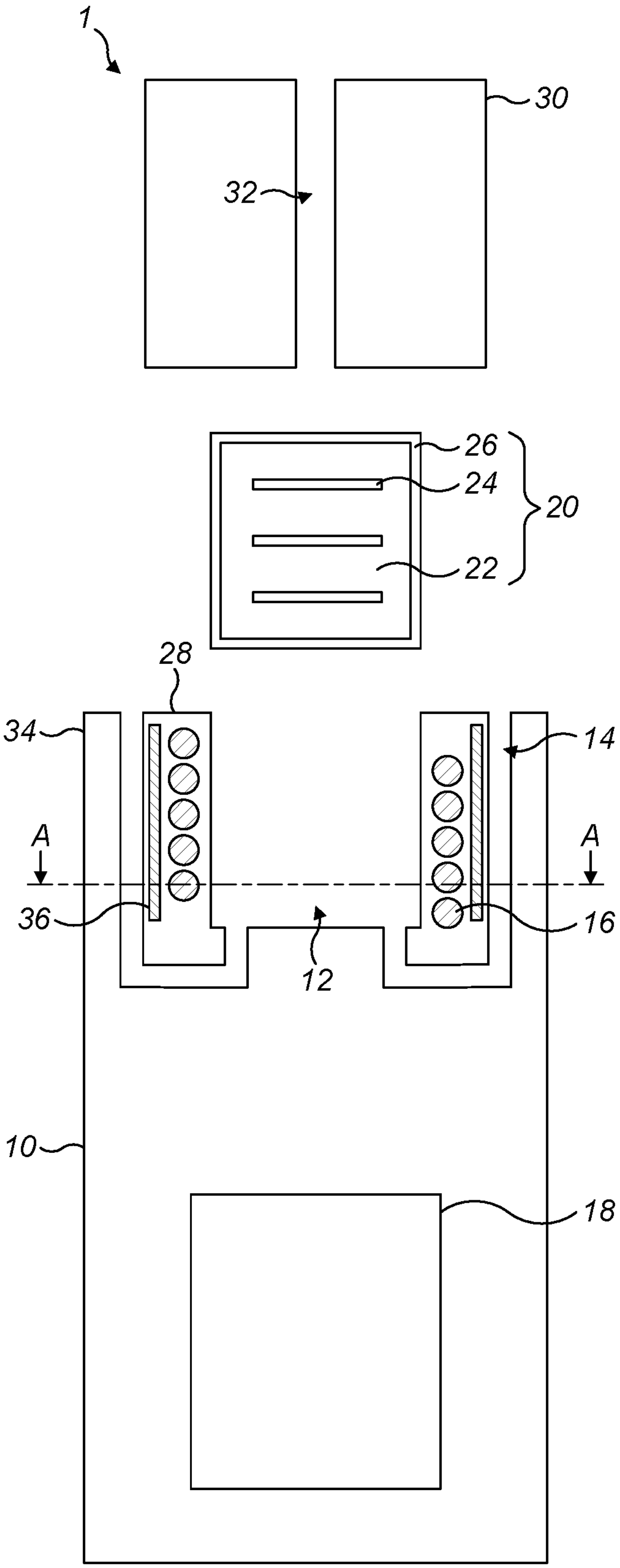
FIG. 2 shows an exploded view of an example vapour generating device.

Referring now to FIG. 1 and FIG. 2, an example vapour generating device is generally illustrated at 1 in an assembled configuration in FIG. 1 and an unassembled configuration in FIG. 2.

The example vapour generating device 1 is a hand held device (by which we intend to mean a device that a user is able to hold and support un-aided in a single hand), which has an induction heating assembly 10, an induction heatable cartridge 20 and a mouthpiece 30. Vapour is released by the cartridge when it is heated. Accordingly, vapour is generated by using the induction heating assembly to heat the induction heatable cartridge. The vapour is then able to be inhaled by a user at the mouthpiece.

In this example, a user inhales the vapour by drawing air into the device 1, through or around the induction heatable cartridge 20 and out of the mouthpiece 30 when the cartridge is heated. This is achieved by the cartridge being located in a heating compartment 12 defined by a portion of the induction heating assembly 10, and the compartment being in gaseous connection with an air inlet 14 formed in the assembly and an air outlet 32 in the mouthpiece when the device is assembled. This allows air to be drawn through the device by application of negative pressure, which is usually created by a user drawing air from the air outlet.

The cartridge 20 is a body which includes a vaporisable substance 22 and an induction heatable susceptor 24. In this example the vaporisable substance includes one or more of tobacco, humectant, glycerine and propylene glycol. The susceptor is a plurality of plates that are electrically conducting. In this example, the cartridge also has a layer or membrane 26 to contain the vaporisable substance and susceptor, with the layer or membrane being air permeable. In other examples the membrane is not present.

As noted above, the induction heating assembly 10 is used to heat the cartridge 20. The assembly includes an induction heating device, in the form of an induction coil 16 and a power source 18. The power source and the induction coil are electrically connected such that electrical power may be selectively transmitted between the two components.

In this example the induction coil 16 is substantially cylindrical such that the form of the induction heating assembly 10 is also substantially cylindrical. The heating compartment 12 is defined radially inward of the induction coil with a base at an axial end of the induction coil and side walls around a radially inner side of the induction coil. The heating compartment is open at an opposing axial end of the induction coil to the base. When the vapour generating device 1 is assembled, the opening is covered by the mouthpiece 30 with an opening to the air outlet 32 being located at the opening of the heating compartment. In the example shown in the figures, the air inlet 14 has an opening into the heating compartment at the base of the heating compartment.

As mentioned above, in order for vapour to be produced, the cartridge 20 is heated. This is achieved by an alternating electrical current changed from a direct electrical current supplied by the power source 18 to the induction coil 16. The current flows through the induction coil causing a controlled EM field to be generated in a region near the coil. The EM field generated provides a source for an external susceptor (in this case the susceptor plates of the cartridge) to absorb the EM energy and convert it to heat, thereby achieving induction heating.

In more detail, by power being provided to the induction coil 16 a current is caused to pass through the induction coil, causing an EM field to be generated. As mentioned above, the current supplied to the induction coil is an alternating (AC) current. This causes heat to be generated within the cartridge because, when the cartridge is located in the heating compartment 12, it is intended that the susceptor plates are arranged (substantially) parallel to the radius of the induction coil 16 as is shown in the figures, or at least have a length component parallel to the radius of the induction coil. Accordingly, when the AC current is supplied to the induction coil while the cartridge is located in the heating compartment, the positioning of the susceptor plates causes eddy currents to be induced in each plate due to coupling of the EM field generated by the induction coil to each susceptor plate. This causes heat to be generated in each plate by induction.

The plates of the cartridge 20 are in thermal communication with the vaporisable substance 22, in this example by direct or indirect contact between each susceptor plate and the vaporisable substance. This means that when the susceptor 24 is inductively heated by the induction coil 16 of the induction heating assembly 10, heat is transferred from the susceptor 24 to the vaporisable substance 22, to heat the vaporisable substance 22 and produce a vapour.

The induction coil 16 is embedded in a wall 28. This restricts contact between the induction coil and the environment around the induction coil. In use, heat passes from the heating compartment 12 into the wall in which the induction coil is embedded, which also provides the side walls to the heating compartment. The induction coil also generates small quantities of heat due to the resistance of the coil.

In order to make use of this heat and to transfer heat away from the induction coil to cool the induction coil, the air inlet 14, which, as mentioned above, is connected to the base of the heating compartment, passes from an opening at one end of the induction coil adjacent where the mouthpiece 30 and the induction heating assembly 10 meet, past the wall within which the induction coil is embedded to the opposing end of the induction coil, across this end to the opening in the base of the heating compartment. When a user draws air through the air outlet 32 in the mouthpiece, air is pulled through the air inlet (as indicated by arrow 48 in FIG. 1) into the heating compartment, through the cartridge (should one be present) and through the air outlet (as indicted by arrow 50 in FIG. 1).

When the air in the air inlet 14 is cooler than the wall 28 in which the induction coil 16 is embedded, heat is transferred from the wall (and therefore from the induction coil) to the air. This warms the air and cools the wall and induction coil. The air that passes through the cartridge is therefore warmer than the air outside of the vapour generating device 1.

In the example shown in FIGS. 1 and 2, the air inlet 14 is enclosed by an outer wall 34. The outer wall provides a barrier between the air inlet and the exterior of the vapour generating device 1. Should the outer wall be warmer than the air in the air inlet, heat is also transferred from the outer wall to the air in the air inlet.

As mentioned above, the air passes into the heating compartment 12 from the air inlet 14 as indicated by arrow 48. The cartridge 20 is a close fit with the heating compartment. As such, the air must pass through the cartridge when passing through the heating compartment containing a cartridge. Air flow around the cartridge is therefore restricted and there is no intentional air flow path around the cartridge between the cartridge and the wall 28 within which the induction coil 16 is embedded. Since the air passing into the heating compartment has been warmed before it enters the heating compartment and cartridge, it limits the amount of heat lost from the cartridge to the air, which keeps the cartridge warmer.

In FIG. 2 there is an EM shield 36 that is embedded in the wall 28 within which the induction coil 16 is embedded. The EM shield is located on the radially outer side of the induction coil. When the vapour generating device 1 is in use, the EM shield will become warm due to the heat produced by the induction coil and in the heating compartment 12, and may become warm due to the currents produced in the shield due to the shielding process.

Figure 3:
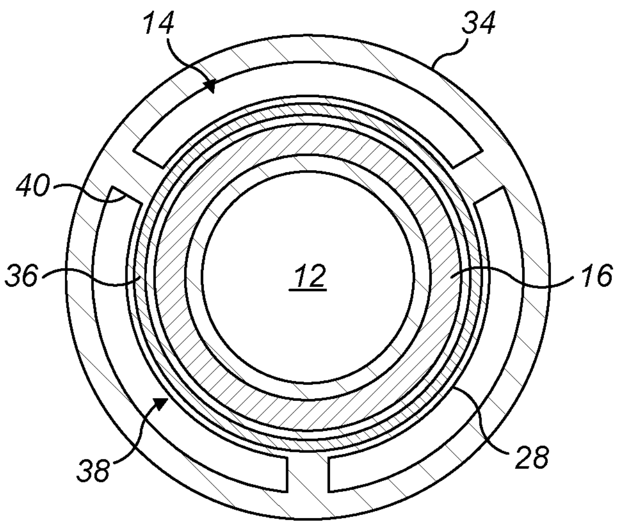
FIG. 3 shows a cross-section of the vapour generating device shown in FIG. 2 along plane A-A in FIG. 2.

A cross-section along plane A-A of FIG. 2 is shown in FIG. 3. This shows a circular body, showing that the vapour generating device is generally cylindrical. The heating compartment 12 is in the centre enclosed by a wall 28 within which the induction coil 16 is embedded along with the EM shield 36.

As in FIG. 2, it can be seen that the EM shield is located around the induction coil on the radially outer side of the coil.

The air vent 14 is located around the wall 28 within which the induction coil 16 and EM shield 36 are embedded. The air vent is divided into arcs 38, each of which provide an air flow path. The air vent is divided by ribs 40. The ribs are connected between the wall within which the induction coil and EM shield are embedded and the outer wall 34 that surrounds the air vent on its radially outer side.

Figure 4:
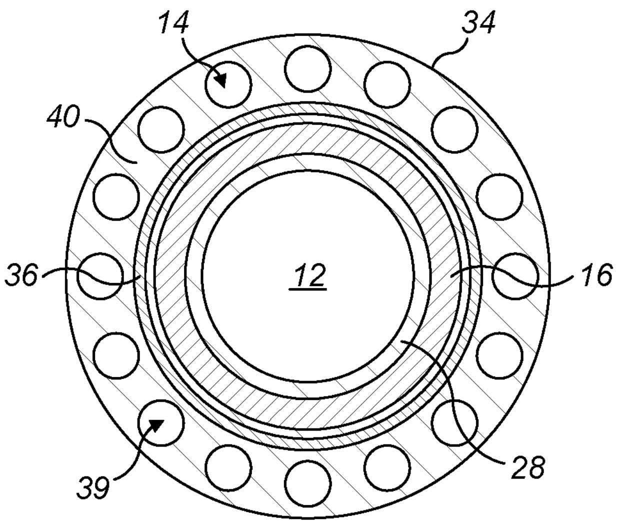
FIG. 4 shows a cross-section of an alternative example vapour generating device along the same plane as shown in FIG. 3.

FIG. 4 shows the same cross-section as shown in FIG. 3 for an alternative example vapour generating device. The device is accordingly still circular with the heating compartment 12 located at its centre. The heating compartment is again enclosed by a wall 28 within which an induction coil 16 and an EM shield 36 are embedded in the same configuration as the vapour generating device shown in FIGS. 2 and 3. Instead of arcs forming air flow paths for the air vent, in this example, the air vent 14 is provided by a plurality of circular bores 39, as in FIG. 4, distributed evenly in a circle on the radially outer side of the EM shield. Each of the bores provides an air flow path and is separated from the adjacent bores by ribs 40 that connect the wall within which the coil and EM shield are embedded to the outer wall 34, which forms the outer wall of the vapour generating device.

Figure 5:
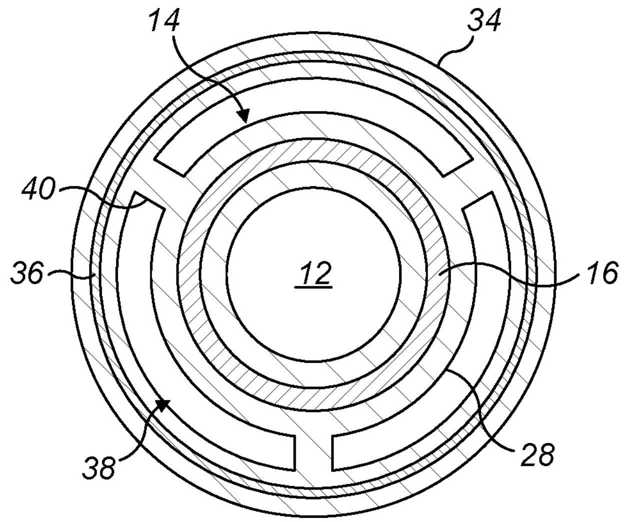
FIG. 5 shows a cross-section of a further example vapour generating device along the same plane as shown in FIG. 3.

The same cross-section of a further alternative example vapour generating device is shown in FIG. 5. The device is again circular with a heating compartment 12 located at is centre. A wall 28 surrounds the heating compartment. The induction coil 16 is embedded within this wall. However, instead of an EM shield also being embedded in this wall as in the example shown in FIG. 3, the EM shield 36 is embedded in the outer wall 34. The outer wall is separated from the wall within which the coil is embedded by the air vent 14. As with the example shown in FIG. 3, the air vent is divided into arcs 38, which are separated by ribs 40. In this configuration the arcs 38 may be provided by a metal tube. In this case the metal tube is able to work as susceptor and provide pre-heating of the air entering the heating compartment 12. The metal tube may also work as an EM shield.

Figure 6:
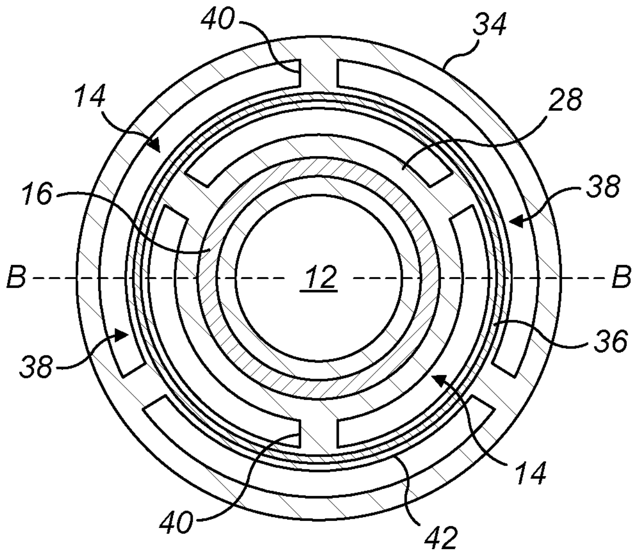
FIG. 6 shows a cross-section of another example vapour generating device along the same plane as shown in FIG. 3.

FIG. 6 shows a cross-section of another alternative example vapour generating device along the same plane as FIGS. 3 to 5. In this example the device has the same structure as the example of FIG. 5, but instead of being the outer wall, the wall within which the EM shield is embedded is an intermediate wall 42. Radially outward from this intermediate wall there is an outer wall 34. There is an air vent 14 between the outer wall and the intermediate wall as well as there being an air vent between the intermediate wall and a wall 28 within which the induction coil 16 is embedded and which surrounds a heating compartment 12. Each air vent is divided into arcs 38 by ribs 40 extending between the respective walls for the respective air vent. Each arc again provides an air flow path.

In the example shown in FIG. 6, the air vent 14 can have one of multiple arrangements. Two such arrangements are shown in FIGS. 7 and 8.

Figure 7:
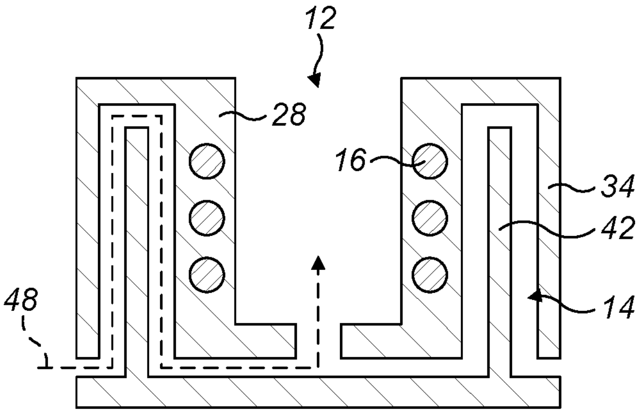
FIG. 7 shows a partial schematic view of an example corresponding to the example of FIG. 6.

FIG. 7 shows an arrangement of an example vapour generating device with a cross-section similar to that shown in FIG. 6. In the arrangement shown in FIG. 7, the vapour generating device has an outer wall 34 that provides the external wall of the device. Radially inward of the outer wall, there is an intermediate wall 42 which has a radial separation from the outer wall and a radial separation from a wall 28 within which an induction coil 16 is embedded. The wall within which the induction coil is embedded is located radially inward of the intermediate wall, and which provides the side walls of a heating compartment 12 defined radially inward of this wall.

There is an air vent 14 that passes from an exterior of the device to the heating compartment. There is a single airflow path running through the air vent, which is indicated at 48 in FIG. 7. The path enters the vapour generating device through the outer wall 34 at a location in line with an axial end of the heating compartment 12. The path then passed between the outer wall and the intermediate wall 42 to a location in line with an opposing axial end of the heating compartment. At this location there is a passage between the gap provided by the radial separation between the outer and intermediate walls and the gap provided by the radial separation between the intermediate wall and the wall 28 within which the induction coil 16 is embedded. The airflow path passes through this passage and returns between the intermediate wall and the wall within which the induction coil is embedded to a location again in line with the initial axial end of the heating compartment, but at a lesser radial separation from the heating compartment than when the path enters the vapour generating device. The path then follows a further passage into the heating compartment at that axial end of the heating compartment.

Figure 8:
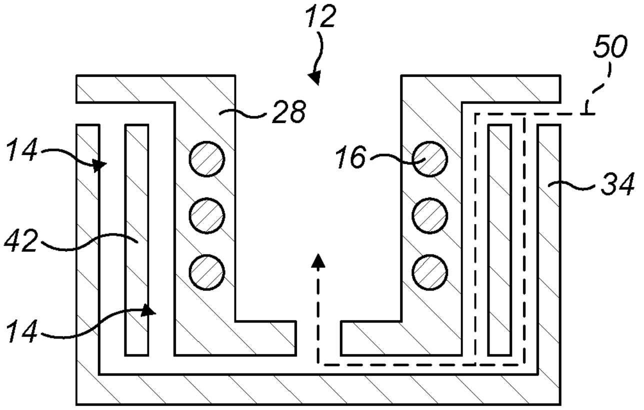
FIG. 8 shows a partial schematic view of an alternative example corresponding to the example of FIG. 6.

FIG. 8 shows an alternative arrangement to that shown in FIG. 7 of an example vapour generating device with a cross-section similar to that shown in FIG. 6. As with the arrangement shown in FIG. 7, in the arrangement shown in FIG. 8, the vapour generating device has an outer wall 34 that provides the external wall of the device. Radially inward of the outer wall, there is an intermediate wall 42 which has a radial separation from the outer wall and a radial separation from a wall 28 within which an induction coil 16 is embedded. The wall within which the induction coil is embedded is located radially inward of the intermediate wall, and which provides the side walls of a heating compartment 12 defined radially inward of this wall.

As with FIG. 7, in FIG. 8, there is an air vent 14 that passes from an exterior of the device to the heating compartment. However, instead of the single airflow path 48 of FIG. 7, the arrangement shown in FIG. 8 has an airflow path, indicated at 50 in FIG. 8, which has a common beginning and common end, but has two generally parallel sections between the beginning and end. The path enters the vapour generating device through the outer wall 34 at a location in line with an axial end of the heating compartment 12. The path then spits. One section of the path passes between the outer wall and the intermediate wall 42 in the gap provided by the radial separation of these walls. The other section of the path passes through a passage to the gap provided by the radial separation between the intermediate wall and the wall 28 within which the induction coil 16 is embedded. This section of the path then passes through this gap. The two sections re-join at a location in line with an opposing end of the heating compartment 12. This is achieved by the section of the path passing between the outer wall and the intermediate wall and then passing through a passage in the intermediate wall at to join the section passing between the intermediate wall and the wall within which the induction coil is embedded to the location equivalent to the opposing axial end of the heating compartment. The path then continues along a common end section into the heating compartment at that axial end of the heating compartment.

As with the example shown in FIG. 6, the arrangements shown in FIGS. 7 and 8 have ribs (not shown in FIGS. 7 and 8) that connect and support the various walls forming arc sections in the air vent 14.

Figure 9:
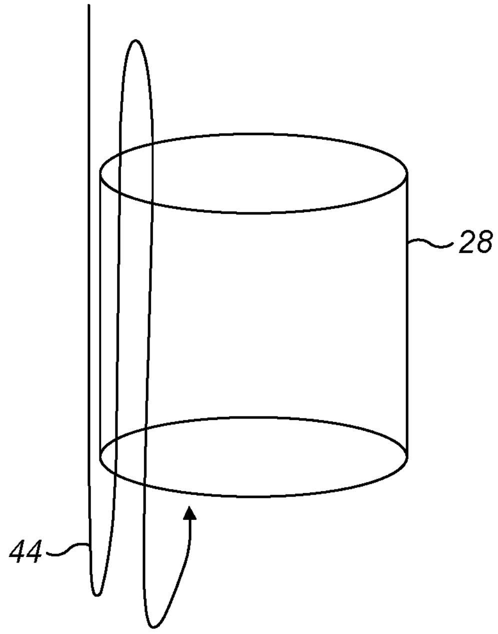
FIG. 9 shows a schematic of a portion of an example vapour generating device with an example air flow path.
Figure 10:
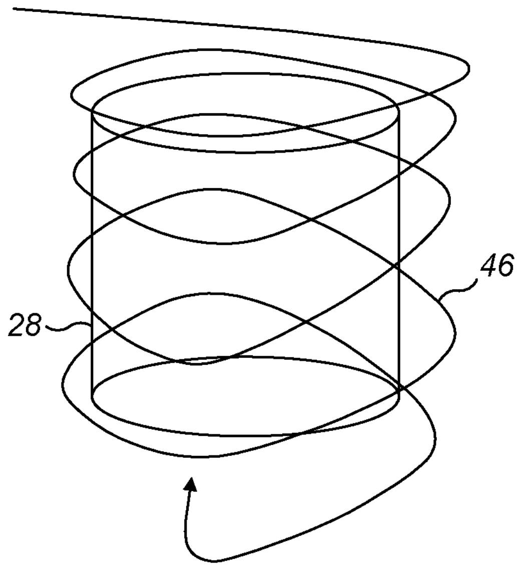
FIG. 10 shows a schematic of a portion of an example vapour generating device with an alternative example air flow path.

FIGS. 9 and 10 each show example air flow paths able to be used in a vapour generation device. Each of these figures shows a cylinder representing the wall 28 within which the induction coil is embedded.

FIG. 9 shows an air flow path 44, which is provided by the air vent (not shown in FIGS. 9 and 10). The air flow path passes around the wall 28 in a zig-zag pattern. By this we intend to mean that the path has parallel sections that are aligned with the longitudinal axis of the cylindrical wall and are joined to adjacent sections by curved sections of air flow path at the ends of the parallel sections. In this configuration one or more air flow paths are arranged around the whole wall.

FIG. 10 shows an air flow path 46. This air flow path is again provided by the air vent (not shown). The air flow path passes around the wall 28 in a spiral passing from one axial end of the wall to the opposing axial end of the wall.

The invention claimed is:

1. An induction heating assembly for a vapour generating device, the heating assembly comprising:

an outer body;

an induction coil arranged inward of the outer body;

a heating compartment defined inward of the induction coil and arranged to receive, in use, a body comprising a vaporisable substance and an induction heatable suspector; wherein the outer body and the induction coil are separated from each other, and an air vent is defined, which is arranged to allow an airflow such that air is passed in a direction along a length of the induction coil to be warmed before the air enters, in use, the body, and the assembly includes ribs to define one or more airflow paths.

2. The induction heating assembly of claim 1, wherein the air vent is shaped to direct the airflow along the induction coil.

3. The induction heating assembly of claim 1, further comprising one or more separators arranged within the outer body to define one or more layers of the air vent.

4. The induction heating assembly of claim 1, wherein the one or more air-flow paths are arranged to be one or more of:

a spiral around the induction coil;

a zig-zag in a longitudinal direction of the induction coil; and a zig-zag in a transverse direction of the induction coil.

5. The induction heating assembly of claim 1, wherein the one or more airflow paths cover more than 50% of an outer surface of the induction coil.

6. The induction heating assembly claim 1, further comprising an electromagnetic shield, the shield being arranged as substantially surrounding a circumference of the air vent.

7. The induction heating assembly of claim 1, wherein the induction coil is arranged substantially within a wall housing the heating compartment.

8. The induction heating assembly of claim 1, wherein the induction coil is embedded in a wall of the heating compartment.

9. The induction heating assembly of claim 1, wherein the heating compartment is adjacent to the induction coil.

10. A vapour generating system comprising:

the induction heating assembly of claim 1; and a body comprising a vaporisable substance and an induction heatable susceptor, wherein the body is, in use, arranged within the heating compartment of the induction heating assembly.

11. The vapor generating system of claim 10, wherein the vaporisable substance and the induction heatable susceptor are contained by the body.

12. The vapor generating system of claim 10, wherein the induction heatable susceptor forms at least part of the air vent.

13. The vapour generating system of claim 10, wherein the vaporisable substance is a solid or semi-solid tobacco substance, and the susceptor is held within and surrounded by the vaporisable substance such that the vaporisable substance forms, in use, a heat absorbing layer between the susceptor and an outer surface of the assembly.

14. The induction heating assembly of claim 1, wherein the induction coil is separated from the air vent by a wall housing the induction coil.

15. The induction heating assembly of claim 1, wherein the air vent is defined such that the air is arranged to be passed inside the device in a direction away from a mouthpiece of the device along the induction coil before the air enters, in use, the body.

16. An induction heating assembly for a vapour generating device, the heating assembly comprising:

an induction coil;

a heating compartment defined inward of the induction coil and arranged to receive, in use, a body comprising a vaporisable substance and an induction heatable suspector; wherein an air vent is defined, which is arranged to allow an airflow such that air is passed through the air vent in a direction along a length of the induction coil to be warmed before the air enters, in use, the body, and the assembly further comprises structures in the air vent arranged to define one or more airflow paths.

17. The induction heating assembly of claim 16, wherein the air vent is defined such that the air is arranged to be passed inside the device in a direction away from a mouthpiece of the device along the induction coil before the air enters, in use, the body.

18. An induction heating assembly for a vapour generating device, the heating assembly comprising:

an outer body;

an induction coil arranged inward of the outer body;

a heating compartment defined inward of the induction coil and arranged to receive, in use, a body comprising a vaporizable substance and an induction heatable susceptor; wherein the outer body and the induction coil are separated from each other, and the assembly defines an air vent including ribs defining one or more airflow paths extending along a length of the induction coil, the air vent arranged to allow air flow along the induction coil in a direction away from a mouthpiece of the device.

19. The induction heating assembly of claim 18, wherein the air vent is defined such that the air flow is arranged along the induction coil from a first end of the induction coil to a second end of the induction coil before the air enters, in use, the body, wherein the first end is closer to the mouthpiece of the device and the second end is opposite the first end.

* * * * *